United States Patent [19]

Aeschlimann et al.

[11] 3,950,096
[45] Apr. 13, 1976

[54] DEVICE FOR THE AUTOMATIC MEASUREMENT OF TUNNEL SECTIONS

[75] Inventors: Jean Philippe Aeschlimann, Lausanne; Pierre Emile Ravussin, Belmont-sur-Lausanne; Jean Pierre Vuille, Epalinges, all of Switzerland

[73] Assignee: Alcyon Electronique & Physique S.A., Lausanne, Switzerland

[22] Filed: Aug. 30, 1974

[21] Appl. No.: 502,040

[30] Foreign Application Priority Data
Aug. 31, 1973 Switzerland.................... 12524/73

[52] U.S. Cl. ..................... 356/1; 356/141; 340/61; 356/4
[51] Int. Cl.[2] ..................... G01C 3/00; G01C 3/08
[58] Field of Search .......... 356/1, 4, 5, 141; 340/61; 246/29 R, 121; 357/63

[56] References Cited
UNITED STATES PATENTS

| | | | |
|---|---|---|---|
| 2,468,042 | 4/1949 | Cranberg | 356/4 |
| 2,783,450 | 2/1957 | Jackson | 340/61 |
| 3,147,384 | 9/1964 | Fenton et al. | 250/203 R |
| 3,705,772 | 12/1972 | Andreas | 356/5 |

*Primary Examiner*—Maynard R. Wilbur
*Assistant Examiner*—S. C. Buczinski
*Attorney, Agent, or Firm*—Imirie, Smiley & Linn

[57] ABSTRACT

This invention relates to a device for the automatic measurement of tunnel sections with a gas-laser and optical means, comprising further an image analyzer which comprises a rotatable disc, an opto-electronic group with light sources, photocells, a photomultiplier and a counter, said image analyzer indicating a value which is proportional to the distance between the tunnel axis and the impact point of the laser beam on the tunnel wall.

9 Claims, 4 Drawing Figures

DEVICE FOR THE AUTOMATIC MEASUREMENT OF TUNNEL SECTIONS

BACKGROUND OF THE INVENTION

The present invention relates to a device for the automatic measurement of tunnel cross- and longitudinal-sections by means of lasers.

It is already known in this art to measure tunnel profiles with photographic methods; however, this procedure proves to be very slow because first of all there have to be taken a great number of photos, and, then each of them has to be measured by a coordinatograph in order to obtain the profile of the tunnel.

Also known in this art is a purely mechanical device comprising a certain number of sensing elements; this kind of device, heavy and expensive, cannot be used for electrified railway tracks.

Another prior art arrangement utilizes two laser beams forming a triangle whose one vertex is directed towards the tunnel wall; if the two sides of the triangle do not meet, it is possible either to measure the distance between the two spots or to shift the base until the two sides of the triangle meet. This device has some disadvantages: It must be ascertained if the two beams meet and then the base must be mechanically shifted. A laser producing two beams must be specially constructed or there must be two of them. In particular, this device can be hardly used for simultaneously measuring several longitudinal sections. If transversal sections have to be obtained as well, a conventional photographical method must be used.

SUMMARY OF THE INVENTION

It is a main object of this invention to provide a purely optical device, which overcomes the above described disadvantages, for the automatic measurement of the profiles of a tunnel.

This measuring device is characterized by the fact that the laser flashes its beam on the tunnel wall, and the image of the resulting spot is projected by an optical system on an image analyzer, which gives a value proportional to the distance between the axis of the tunnel and the impact point of the beam on the tunnel wall.

Still another advantage of this invention is to provide a device emitting a signal every time the distance between a master-gauge and the tunnel exceeds a fixed value.

By multiplying the number of laser beams it is possible to capture and record a great number of measures allowing to control automatically the transversal and the longitudinal section of a tunnel. By obtaining a signal every time that the tunnel diverges from a certain value of its master-gauge it is possible to record only particular values. Additional objects and advantages of the present invention will become apparent upon consideration of the following description when taken in conjunction with the accompanying drawings.

DETAILED DESCRIPTION OF THE PREFERRED EMBODIMENT

Figure 1:
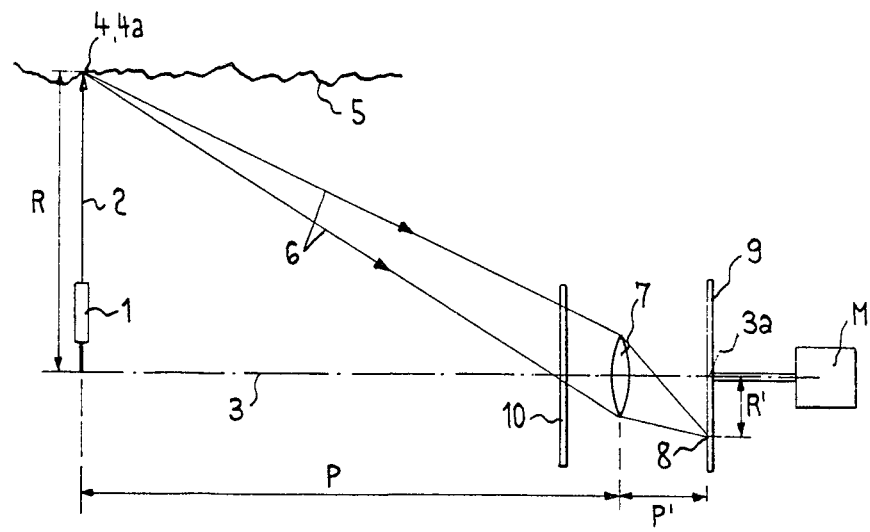
FIG. 1 is a schematic view of the optical system according to the present invention.

The laser 1 (FIG. 1), for example a He-Ne low power laser (1 mW in order not to damage the eyes) sends out a beam 2 in a direction perpendicular to the axis of the tunnel 3. The beam is intercepted at 4, forming a spot 4a on the wall of the tunnel 5. An optical system 7, with a determined focal length (f) forms an image 8 of the sport 4a on the disc 9, whose axis 3a coincides with the one (3) of the tunnel. An interferential filter 10 cuts any interfering light that might come from the lighting of the tunnel or the instruments, and lets pass only the reflected laser light 6. By imaging the spot 4a an optical device, with known characteristics, it is possible to reduce the measurement of R, which is the distance between the axis of the tunnel 3 and the impact point 4, to a measurement between the image 8 of the spot and the axis of the disc, i.e. to a measurement of the distance R'. This is demonstrated by the relations from geometrical optics:

$$\frac{R'}{R} = \frac{p'}{p} \text{ and } \frac{1}{p} + \frac{1}{p'} = \frac{1}{f}$$

where:

$f$ is the known focal length of the optical system 7.

$p$ the known distance between the optical system 7 and the axis 2 of the laser 1.

$p'$ the known distance between the optical system 7 and the plate 9 which is in the focal plane.

$R'$ the distance between the axis of the plate, respective of the tunnel and the image of the spot 8, $R$ is the distance which must be determined between the axis of the tunnel 3 and the point 4.

$f$, $p$ and $p'$ being constant and known, the measurement of $R'$ permits the evaluation of R.

Figure 2:
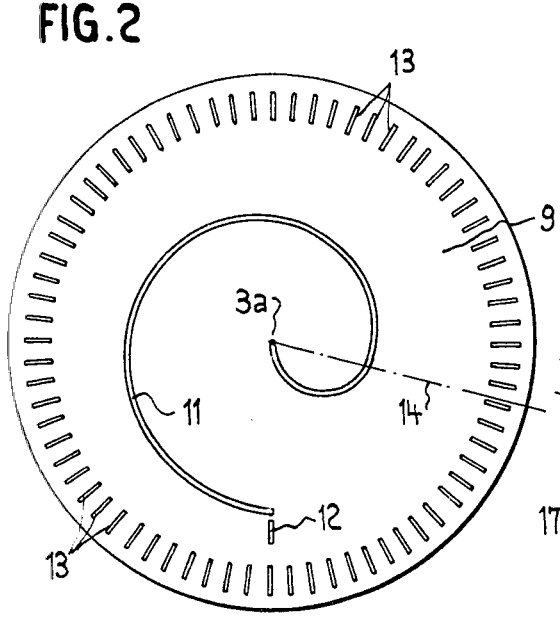
FIG. 2 is an elevational view which shows the measuring disc of the system of FIG. 1
Figure 3:
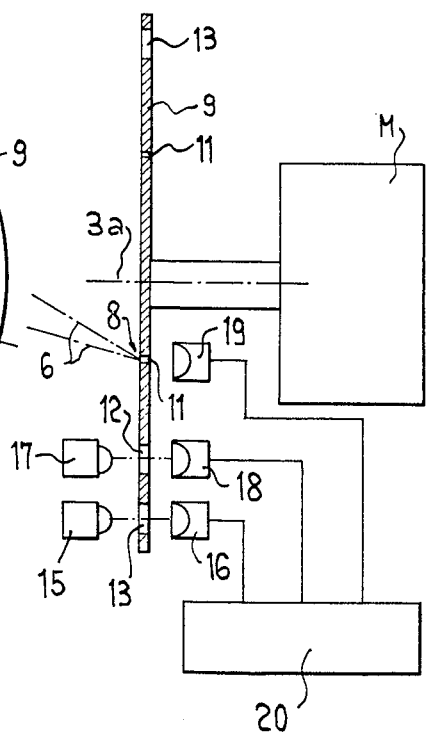
FIG. 3 is a diagrammatic view of the image-analyzer of the system of FIG. 1.

In the new device it is possible to measure $R'$ automatically with the help of the disc 9. This disc (see FIG. 2) driven at high speed by a motor M (FIG. 3), comprises a slit in a spiral form 11, a reference slit 12 and a series of slits 13 regularly spaced on the circumference. The center 3a of the disc is in the axis of the tunnel.

The spiral 11 is arranged in order to produce a linear relation between the distance $R'$, from the center 3a to the spiral 11, (measured on the radius 14) and on the number of slits 13, counted from the reference slit 12 up to the radius 14. It means that the measuring of a distance can thus be reduced to counting of a number of slits. This number of slits is counted in the following way: the disc rotating, while the reference slit 12 is opposite the light source 17, a signal appears on the photocell 18. This signal releases the counter 20; then, every time one of the slits 13 passes between the light source 15 and the photocell 16, the counter advances by one unit.

When the image 8 is opposite the spiral 11, the weak light signal that passes through it is amplified by the photomultiplier tube 19 whose output signal stops the counter 20. The disc 9 with its motor, the group of elements 15 – 19 and the counter consititute the image-analyzer. By a judicious choice of the geometry of the slits of the disc 9, the display of the counter 20 directly gives the distance R in a determined system of units (for example 1 pulse = 1 cm or 1 pulse = 1 inch).

This device permits meausurement of a certain number of points on a tunnel generating line. The number of measurement points for a unit of length depends on the rotation speed on the disc and on the advancing speed of the carriage in the tunnel. For instance, with a motor rotating at about 6000 r.p.m. and an advancing speed of the carriage at 30 km/h, a measurement every 10 cm is obtained.

Figure 4:
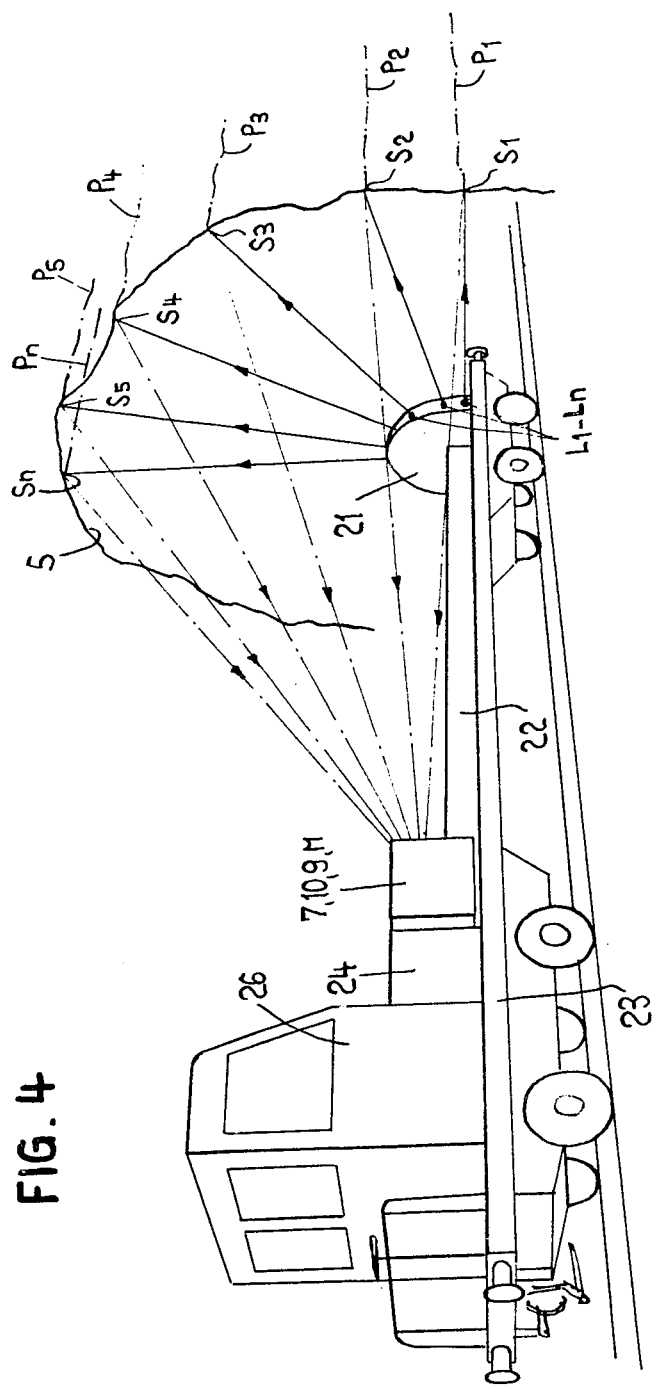
FIG. 4 is a perspective view which shows the mounting of the device on a railway carriage with a great number of light sources.

When a tunnel is controlled it is not enough to point out one generatrix, but it is better to measure many of them simultaneously in order to obtain transversal tunnel profiles at the same time. To do it, one only has to increase the number of laser beams and, together with it, the number of groups of elements 15 – 20. A more powerful laser could be imagined, the number of beams being multiplied by an optical device. But for security reasons, it is preferrable to use one laser per beam and the aggregate 21 is then obtained, as illustrated in the FIG. 4, with lasers $L_1 \ldots L_n$, all set up perpendicularly to the axis of the tunnel 3. The spots $S_1 \ldots S_n$ of the impact points of the beams with the wall of the tunnel 5, each forming a longitudinal profile $P_1 \ldots P_n$, are projected by an optical system 7 through an interferential filter 10 on the disc; $R_1 \ldots R_n$ indicating the distance between the impact points of the lasers beams with the tunnel axis. The whole optical part is set up on an optical bench 22 which, itself, is set on the carriage 23. The electronic device 24, comprising the groups of elements 15 – 19, 20 and the motor M is behind the disc 9, while the adjustment systems and the plotter which are not shown in detail, are in the cabin 26 of the carriage.

The motion of the carriage may be measured with a roller connected to a wheel of the carriage which gives a pulse for a determined motion of the carriage.

For every laser beam, which represents a channel, there is a group of elements 15 – 19 and a counter whose digital data are compared, by algebraic subtraction effectuated by a comparator, to reference values corresponding to the theoretical profile of the tunnel. These references are previously adjusted manually for each type of profile. The algebraic difference thus calculated is transformed into an analog value (voltage) by means of a converter. The analog value which represents the difference between theoretical profile and the real profile is recorded on a plotter. The signals corresponding to the advance of the moving base are recorded by means of an additional channel of the plotter.

An important element of the image-analyzer described in this example has been the disc 9 which is considered to be the best solution from many points of view. But it is quite imaginable to replace it for instance by an optoelectronic semi-conductor device which permits the determination of distance of one point with respect to another, or to use, for instance, a Vidicon tube (Registered Trademark).

It is clear that, if for any reasons only the values of R are needed it is possible to record them also on a plotter or to choose only a few generatrixes.

On the other hand it may be desirable to limit the observations to the one the spot-measurement of errors in the profile. Then, when a negative sign appears on the comparator it means that the tunnel is out of tolerance. The negative signal can then serve to release an alarm signal which may be acoustic. This signal could induce a particular recording on the plotter, for instance, of negative signals instead of positive ones.

Although the device has been described by the example of a tunnel profile and although it is mainly designed for this task is quite imaginable to apply this new device, with some modifications, in other fields without leaving the idea of the invention. It is also imaginable to use another laser than a gas one, for example a semiconductor laser.

What is claimed is:

1. A device for the measurement of tunnel profiles, comprising means for generating a beam of light and directing said beam onto the tunnel wall to illuminate a spot thereon;

an image analyzer; and optical means cooperating with said light generating means and said image analyzer to project said illuminated spot onto said image analyzer whereby the distance of said projected spot from the axis of said optical means is proportional to the distance of said illuminated spot from said axis;

said image analyzer including a rotable disc coaxially disposed with respect to said optical means and having a spiral slit running from the center of said disc toward the periphery thereof, a reference slit, and a series of slits regularly spaced about the circumference of the disc, said spiral slit being formed to produce a linear relationship between (a) the distance from the center of the disc to a point on the spiral and (b) the number of said circumferentially disposed slits counted from said reference slit up to a radius passing through the point on said spiral slit, a light detector disposed adjacent said disc and responsive to said projected spot passing through said spiral slit for generating a signal, and means cooperating with said disc for counting said circumferentially spaced slits from said reference slit as said disc rotates until said light detector signal is generated whereby the distance to said illuminated spot on the tunnel wall is measured from said axis.

2. A device according to claim 1, wherein said light generating means comprises a laser.

3. A device according to claim 1, wherein said light detector comprises a photomultiplier.

4. A device according to claim 1, wherein said image analyzer further includes a light filter for filtering out all light except the light from said illuminated spot.

5. A device according to claim 1 wherein the slits of the disc are disposed and spaced such that the count of said counting means is a direct indication of distance in a determined system of units.

6. A device according to claim 1, wherein said counting means comprises first means adjacent said disc and responsive to said reference slit to generate a start signal, second means adjacent said disc and responsive to said circumferentially spaced slits to generate a series of count pulses as said disc rotates, and a counting circuit connected to said light detector, said first means and said second means, said counting circuit counting the number of said count pulses between said start signal and said light detector signal.

7. A device according to claims 6 wherein said each of said first and second means comprises a light source and photocell assembly disposed respectively on opposite sides of said disc.

8. A device according to claim 6 wherein said light generating means comprisis plurality of lasers illuminating a like plurality of spaced spots on the tunnel wall, and wherein said counting means comprises a like plurality of first and second means disposed in spaced relationship about said disc and connected to said counting circuit whereby a plurality of measurements may be simultaneously made.

9. A device according to claim 8 wherein said plurality of lasers are mounted such that the light beams therefrom lie in a single plane perpendicular to the axis of said optical means.

* * * * *